US006223844B1

(12) United States Patent
Greenhill et al.

(10) Patent No.: US 6,223,844 B1
(45) Date of Patent: May 1, 2001

(54) FUEL CELL ENGINE HAVING A PROPULSION MOTOR OPERATIVELY CONNECTED TO DRIVE A FLUID SUPPLY DEVICE

(75) Inventors: Craig J. Greenhill, Richmond; W. Edward Mufford, Langley; Adrian J. Corless; Robert D. Merritt, both of Vancouver, all of (CA)

(73) Assignee: Xcellsis GmbH, Kirchheim/Teck (DE)

( * ) Notice: Subject to any disclaimer, the term of this patent is extended or adjusted under 35 U.S.C. 154(b) by 0 days.

(21) Appl. No.: 09/528,894

(22) Filed: Mar. 20, 2000

Related U.S. Application Data

(63) Continuation of application No. 08/982,165, filed on Dec. 1, 1997, now Pat. No. 6,053,266.

(51) Int. Cl.[7] .......... B60K 1/00
(52) U.S. Cl. .......... 180/65.3; 180/65.1
(58) Field of Search .......... 180/65.1, 68.4, 180/65.3, 65.6, 65.7, 65.8, 165

(56) References Cited

U.S. PATENT DOCUMENTS

| | | | |
|---|---|---|---|
| 4,222,450 | 9/1980 | Fobbs | 180/65 |
| 4,317,634 | 3/1982 | Zupancic et al. | 366/1 |
| 4,734,077 | 3/1988 | Taylor et al. | 446/462 |
| 5,249,637 | 10/1993 | Heidl et al. | 180/65.2 |
| 5,360,679 | 11/1994 | Buswell et al. | 429/19 |
| 5,441,821 | 8/1995 | Merritt et al. | 429/17 |
| 5,662,184 | 9/1997 | Riemer et al. | 180/65.1 |

FOREIGN PATENT DOCUMENTS

| | | |
|---|---|---|
| 44 12 451 C1 | 9/1995 | (DE) . |
| 0 633 158 A1 | 1/1995 | (EP) . |
| 1 447 835 | 9/1976 | (JP) . |
| WO 88/00491 | 1/1988 | (WO) . |

*Primary Examiner*—Richard M. Camby
(74) *Attorney, Agent, or Firm*—McAndrews, Held & Malloy, Ltd.

(57) ABSTRACT

A fuel cell engine for a vehicle comprises at least one fuel cell stack for producing electric power from a fuel and an oxidant, a propulsion motor, for propelling the vehicle. The propulsion motor is connected to receive electric power from the at least one fuel cell stack and is operatively connected to mechanically drive a device for directing a fluid stream into the fuel cell stack. In preferred embodiments the propulsion motor is operatively connected to drive a device for directing at least one reactant fluid stream into the fuel cell stack.

9 Claims, 4 Drawing Sheets

254 256 300 210 215 COOLANT AIR SUPPLY 222 FUEL SUPPLY COOLANT SUPPLY 290 236 232 230 226 264 224 223 240 220 266 205 284 274

200
110
+
-
FUEL SUPPLY SYSTEM
190
FUEL STORAGE
195
138
139
V
OXIDANT SUPPLY SYSTEM
P
130
136
PURE WATER SYSTEM
140
GLYCOL SYSTEM
146
148
154
156
164
AIR BRAKE SYSTEM
165
166
24 VDC SYSTEM
ALTERNATOR
167
168
POWER STEERING SYSTEM
169
AIR CONDITIONING SYSTEM
176
174
TRACTION MOTOR COOLING & LUBRICATION SYSTEM
186
184
126
M
124
120
122

300
256
254
COOLANT
AIR SUPPLY
COOLANT SUPPLY
FUEL SUPPLY
215
210
290
222
226
224
223
220
266
284
274
236
230
232
264
240
205

FUEL CELL ENGINE HAVING A PROPULSION MOTOR OPERATIVELY CONNECTED TO DRIVE A FLUID SUPPLY DEVICE

CROSS-REFERENCE TO RELATED APPLICATION

This application is a continuation of U.S. patent application Ser. No. 08/982,165 filed Dec. 1, 1997 now U.S. Pat. No. 6,053,266 entitled "Fuel Cell Engine Having A Propulsion Motor Operatively Connected To Drive A Fluid Supply Device". The '165 application is incorporated herein by reference in its entirety.

FIELD OF THE INVENTION

The present invention relates generally to fuel cell powered vehicles in which the propulsion motor receives electrical power from a fuel cell stack and, more particularly, to a fuel cell vehicle engine in which the propulsion motor is operatively connected to a device associated with the supply of a fluid stream to a fuel cell stack.

BACKGROUND OF THE INVENTION

Electrochemical fuel cells are an attractive power source for electric vehicles, including wheeled vehicles, trains, marine vessels and airborne vehicles. Electrochemical fuel cells convert a fuel and an oxidant to produce electric power, which can be used to power an electric propulsion motor in a vehicle. Thus, in a fuel cell engine, fuel- and oxidant-containing reactant streams are supplied to a fuel cell stack in order for it to operate. Typically a coolant fluid stream is also supplied to the fuel cell stack. Fuel cell stacks typically include inlet ports and manifolds for directing a fuel stream and an oxidant stream to the anode and cathode, respectively, and corresponding exhaust manifolds and outlet ports for expelling unreacted fuel and oxidant streams and reaction products. Stacks also usually include an inlet part and manifold for directing a coolant fluid to interior channels within the stack, as well as an exhaust manifold and outlet port for coolant fluid exiting the stack. As used herein, the term fuel cell stack refers to a plurality of fuel cells, regardless of the nature of their configuration or electrical interconnection.

In conventional fuel cell powered wheeled vehicles, one or more fuel cell stacks are used to electrically power an electric propulsion motor which is directly coupled, optionally via a speed reducer (single or multiple ratio transmission), to the vehicle drive shaft. In addition, the fuel cell stack provides independent electric power to numerous separate motors which drive auxiliary devices including pumps and heaters, such as, for example, an oxidant air compressor, fuel pump, power steering pump, air brake compressor, air conditioning compressor, cooling fans, and the like. Typically, when the vehicle is stationary, the propulsion motor does not rotate, and therefore auxiliary devices cannot be driven by the propulsion motor when the vehicle is stationary.

The separate motors for the auxiliary devices add significantly to the weight, volume, cost and complexity of a fuel cell engine. In particular, each motor in the system generally requires a motor controller or inverter (for example, for each synchronous AC motor) and associated control system, thus many duplicate components and subassemblies are required.

A fuel cell engine and its associated control systems can be simplified considerably by coupling the propulsion motor to mechanically drive one or more auxiliary devices in the vehicle.

It is particularly advantageous to couple the propulsion motor to mechanically drive one or more devices associated with the supply of a fluid stream to the fuel cell stack. For example, when the propulsion motor is coupled to drive a device for directing a reactant stream into the fuel cell stack a synergistic effect arises which can simplify and stabilize the engine control system. The electrical power output of a fuel cell stack is related to the rate of supply of fuel and oxidant to the fuel cells of the stack. As the vehicle requires more propulsive power the propulsion motor (at any specific torque) will demand more electric power from the fuel cell stack to increase its speed. As the speed of the propulsion motor increases so will the speed of a reactant supply device mechanically coupled to it, thus increasing the rate of reactant delivery to the stack in concert with the demand for increased electrical power output.

Similarly with stack cooling fluids, an inherent increase in the rate of coolant circulation as the propulsion motor demands more electric power, may be beneficial. One or more of the fuel cell stack cooling pumps may be coupled to be driven by the propulsion motor. Typically the stack generates more heat as it produces more power so, provided the increased rate of coolant circulation results in greater cooling, this arrangement can be advantageous.

SUMMARY OF THE INVENTION

In the present approach, an electric motor drives the propulsion system of the vehicle and the same motor is coupled to drive at least one device associated with the supply of a fluid stream into the fuel cell stack, and optionally other auxiliary devices in the vehicle, via a power take-off mechanism.

A fuel cell engine for a vehicle comprises at least one fuel cell stack for producing electric power from a fuel and an oxidant, a propulsion motor for propelling the vehicle, the motor being connected to receive electric power from the at least one fuel cell stack and operatively connected to mechanically drive a device for directing a fluid stream into the fuel cell stack. In preferred embodiments, the at least one fuel cell stack is a solid polymer fuel cell stack.

The propulsion motor is preferably coupled for propelling the vehicle via a transmission. In most terrestrial vehicles it is preferable to couple the electric propulsion motor to the vehicle drive shaft via a multi-ratio transmission or continuously variable ratio transmission, which may be automatic or manually controlled. The transmission can modify the propulsion motor r.p.m. and torque to meet the instantaneous propulsion power requirements of the vehicle. If the instantaneous torque requirement of the vehicle cannot be met at a particular propulsion motor speed because the engine power is limited (for example, because of a limit in the rate of delivery of a reactant stream into the fuel cell stack by a device mechanically coupled to the propulsion motor), then the transmission allows the ratio of the propulsion motor speed to vehicle speed to be adjusted to meet the torque requirement (correspondingly adjusting the reactant stream flow rate to better match the fuel cell power output requirement). Further, if a particular propulsion motor speed causes a reactant stream to be directed into the stack at too high a rate, then again the ratio between the propulsion motor speed and vehicle speed can be reduced via the transmission. Thus, through a transmission the propulsion power output may be adjusted somewhat independently of the requirements of a fluid delivery device, or any other auxiliary devices, coupled to the propulsion motor.

A further advantage is realized by having a transmission when the propulsion motor is mechanically coupled to drive a device for directing a reactant stream to the fuel cell stack. If the engine power demand cannot be met at a particular propulsion motor speed and the transmission reduces the ratio between vehicle speed and propulsion motor speed, the reactant supply device may be accelerated by the vehicle's inertia, thus assisting the fuel cell stack to respond more quickly to meet the increased power demand. In conventional systems, when fuel cell power demand increases, the energy required to accelerate a reactant supply device is derived only electrically from the fuel cell itself, thus the system may be slower to respond, due to limitations in the capability of motor and/or inverter of the device and in the fuel cell power output.

It is preferable that the propulsion motor be coupled for propelling the vehicle via a selective coupling mechanism, particularly in wheeled vehicles. This enables the propulsion motor to continue to drive auxiliary loads when the vehicle is idling and its speed is zero, and enables the motor and auxiliary loads to be driven slower when the vehicle is coasting (for example, downhill). The selective decoupling mechanism may comprise, for example, a clutch or torque converter. It is preferable that the decoupling device be capable of transmitting maximum motor torque while slipping, for substantial durations, during acceleration. The selective coupling mechanism may be part of the transmission system. A selective coupling mechanism may not be necessary or preferable in all vehicles, for example in a plane or boat. For example, in a boat driven by a propeller, the propeller could be feathered to decouple the motion of the vehicle from the on-going running of the propulsion motor.

In preferred embodiments of a fuel cell engine, the propulsion motor is operatively connected to mechanically drive a device for directing at least one reactant fluid stream into the fuel cell stack. This may be an oxidant stream and/or a fuel stream. It is particularly preferred to operatively connect the propulsion motor to drive an air compressor for directing oxygen-containing air to the fuel cell cathodes in the fuel cell stack. The propulsion motor may be operatively connected to drive a fuel pump for directing a fuel stream into the fuel cell stack, optionally via a fuel processor or fuel purification subsystem. For example, the propulsion motor may be operatively connected to drive a pump for directing a process stream (such as methanol, natural gas, gasoline) to a reformer, or to drive a pump for directing a hydrogen-containing stream to a hydrogen separator device in a fuel cell engine. The propulsion motor may be operatively connected to drive a reactant stream recirculation pump for recirculating a reactant stream, for example hydrogen or methanol, through the fuel cell stack.

As described above, when the propulsion motor is coupled to drive a device for directing a reactant stream into the fuel cell stack, increases in the rate at which the reactant is directed to the stack tend to be synchronized with the demand for increased electrical power output from the stack. However, in a terrestrial wheeled vehicle during certain periods of the drive cycle in which the propulsion motor is driven by the vehicle motion, for example on a downhill, it is advantageous to be able to divert the reactant stream away from the fuel cell stack or to decouple the reactant delivery device from the rotation of the propulsion motor.

Auxiliary devices which remain mechanically coupled to the propulsion motor in this situation derive their mechanical power from the vehicle's kinetic energy and may therefore advantageously reduce the energy required for braking of the vehicle.

To start the fuel cell engine, it may be desirable to use an independent electric power source to turn the propulsion motor directly, or using a starter motor (for example, a conventional battery powered automotive starter motor), to commence the supply of one or more of the reactants to the fuel cell stack, so that the fuel cell stack commences electric power generation. Alternatively, pressurized sources of fuel and/or oxidant may be stored on board the vehicle for delivery to the fuel cell stack at start-up. Other means of starting such a fuel cell engine will be apparent to those skilled in the art.

In other embodiments of a fuel cell engine, the propulsion motor is operatively connected to mechanically drive a coolant pump for directing at least one coolant stream into the fuel cell stack.

The fuel cell engine typically further comprises a plurality of auxiliary mechanical loads and the propulsion motor is preferably operatively connected to drive at least one of the plurality of the auxiliary mechanical loads. The control system is simplified in that the torque and power requirements of the auxiliary devices may be managed concurrently with the torque and power requirements for propulsion. The inherent interrelationship between the operation of the propulsion motor and one or more other devices means that they do not have to be independently controlled.

Any of the fluid delivery devices or auxiliaries which are to be driven by the propulsion motor may optionally be coupled to the motor via a speed reducer or transmission to control or adjust the speed at which the auxiliary device is driven relative to the speed or phase of the propulsion motor. Also, the auxiliaries may be selectively coupled, rather than permanently coupled, to the propulsion motor via selective coupling mechanism (actuated manually, mechanically or electrically under electronic or operator control) which allows them to be selectively disengaged.

In the above embodiments, the propulsion motor may be operatively connected to drive fluid delivery devices and auxiliary mechanical loads via a variety of conventional power take-off mechanisms. Exemplary power take-off mechanisms which can be used to operatively connect the propulsion motor to drive other devices include gears, chain drives, belt drives, pulley drives and hydraulic, hydrostatic or magnetic means.

The preferred propulsion motor depends on the nature of the vehicle. Preferred motors include double-ended motors having a drive shaft extending from two sides thereof.

In fuel cell engines it is advantageous to drive multiple auxiliary devices using the propulsion motor, for the reasons described above. However, some auxiliary devices may be driven by separate motors which may be independently electrically connected to the fuel cell stack.

The present approach is also applicable in wheeled vehicles which use one or more wheel motors, rather than a main propulsion motor, to propel the vehicle. For example, a fuel cell engine for a wheeled vehicle may comprise at least one fuel cell stack for producing electric power from a fuel and an oxidant, at least one wheel motor connected to receive electric power from the at least one fuel cell stack, and a primary motor also connected to receive electric power from the at least one fuel cell stack, the primary motor being operatively connected to mechanically drive a device for directing a fluid stream into the fuel cell stack.

Preferably the fluid stream comprises a reactant for the fuel cell stack, and the primary motor is further operatively connected to drive one, or preferably more, of the plurality of other auxiliary mechanical loads on the vehicle.

This approach could also be used in a fuel cell stationary powerplant or portable generator wherein the "prime mover"

or primary motor could be used to mechanically drive one or preferably more auxiliaries, including a device associated with the supply of a fluid stream to a fuel cell stack.

DETAILED DESCRIPTION OF THE PREFERRED EMBODIMENTS

Figure 1:
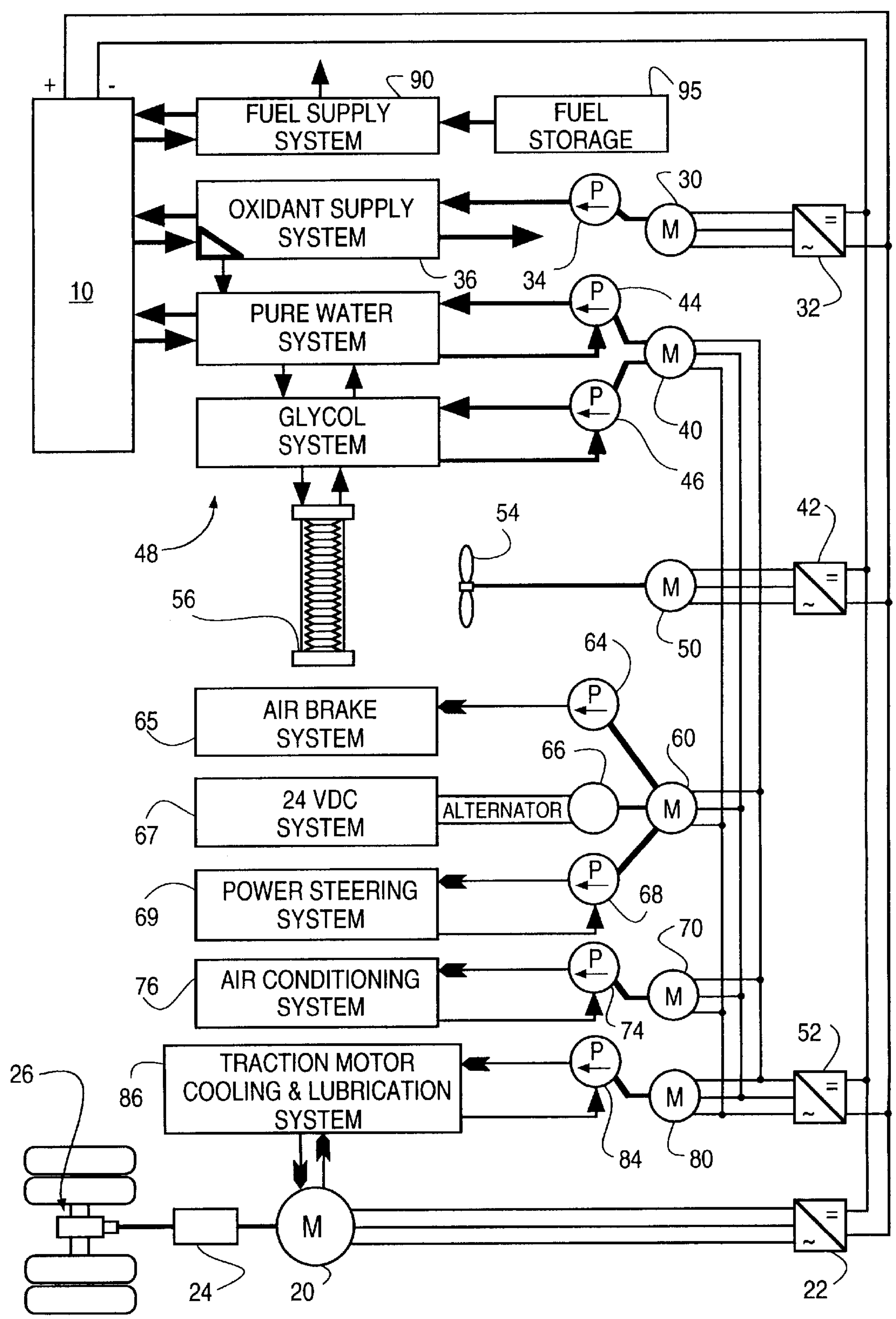
FIG. 1 shows a simplified schematic diagram a conventional fuel cell engine for a wheeled vehicle (prior art).
Figure 2:
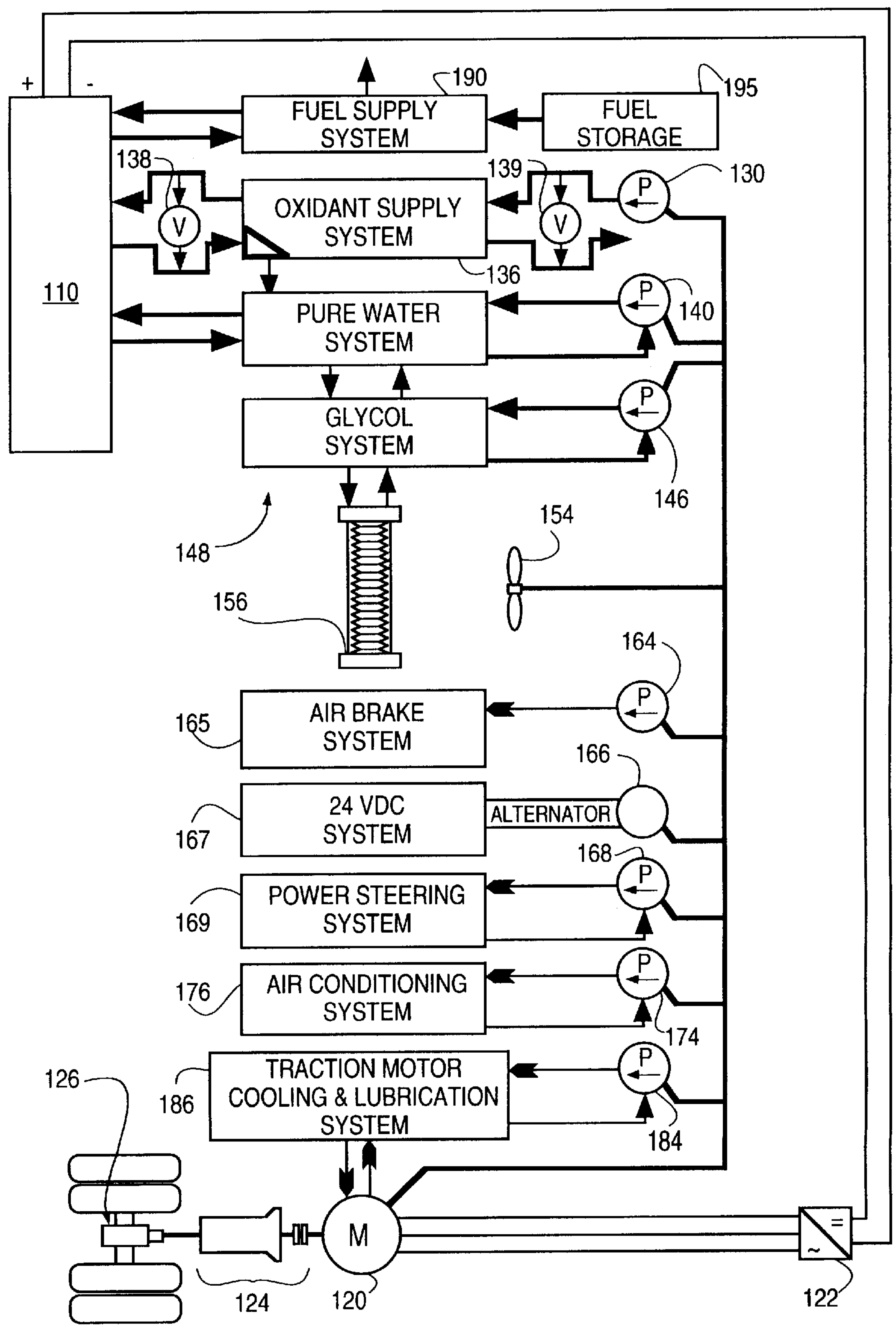
FIG. 2 shows a simplified schematic diagram of an embodiment of a fuel cell engine with the traction motor operatively connected to drive various auxiliary devices including a stack fluid supply device.
Figure 4:
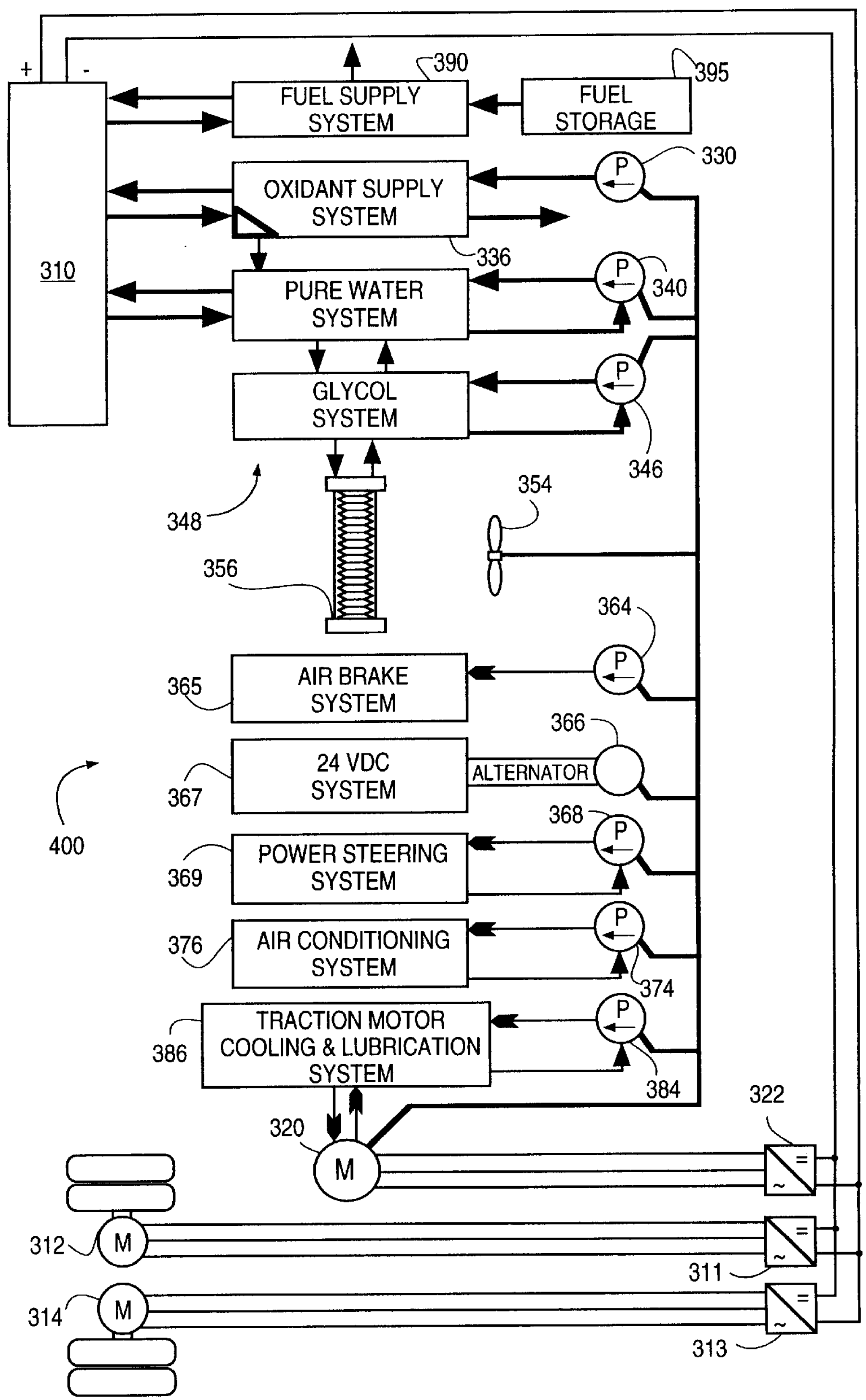
FIG. 4 shows a simplified schematic diagram of an embodiment of a fuel cell engine with wheel motors powered by fuel cell electric power, and a primary motor operatively connected to drive various auxiliary devices including a stack fluid supply device.

In FIGS. 1, 2 and 4 electrical connections are indicated with fine lines, mechanical connections are indicated with bold lines, and fluid connections or paths are shown as bold lines with arrowheads indicating the direction of fluid flow.

FIG. 1 is a simplified schematic diagram of an example of a conventional fuel cell engine 100 for a wheeled vehicle such as a transit bus (prior art). An array of fuel cell stacks 10 is connected to deliver electric power to an electric traction motor 20, via an inverter/motor controller 22. In the illustrated engine, traction motor 20 is directly coupled, via a single ratio transmission (speed reducer) 24, to the vehicle drive axle assembly 26. In addition, fuel cell stack array 10 is connected to provide independent electric power to six separate motors 30, 40, 50, 60, 70 and 80, via three separate inverters/motor controllers 32, 42 and 52 in engine 100. Motor 30 drives a pump 34, such as an air compressor, for directing an oxidant stream into fuel cell stack array 10 via an oxidant supply subsystem 36. Motor 40 drives pumps 44 and 46 which circulate coolant fluids in fuel cell stack cooling system 48. Motor 50 drives fan 54 for cooling radiator 56, through which a cooling fluid is circulated by pump 46. Motor 60 drives a compressor 64 in air brake system 65, alternator 66 connected to 24 volt DC system 67, and a fluid pump 68 in power steering system 69. Motor 70 drives a compressor 74 used in the vehicle's air conditioning system 76, and motor 80 drives one or more pumps 84 in the traction motor cooling and lubrication systems 86. The separate motors for the various fluid supply and other auxiliary devices add significantly to the weight, volume, cost and complexity of the fuel cell engine.

Fuel is supplied to the fuel cell stacks of array 10 from a fuel storage system 95 comprising, for example, pressurized hydrogen gas cylinders, via a fuel supply system 90 which may optionally include a recirculation pump or ejector, and a purge valve.

FIG. 2 is a simplified schematic diagram of an embodiment of a fuel cell engine 200 for a wheeled vehicle, such as a transit bus, wherein traction motor 120 is operatively connected to drive various auxiliary devices including fluid supply devices for directing fluid streams to the fuel cell stacks in an array 110. Fuel cell stack array 110 is connected to deliver electric power to electric traction motor 120, via an inverter/motor controller 122. In the illustrated embodiment, traction motor 120 is decouplable from the vehicle drive axle assembly 126 via a multi-speed manual transmission 124 with reverse gear and friction clutch. Traction motor 120 is also mechanically coupled to drive a plurality of mechanical loads, including an air compressor 130 for directing a reactant oxidant stream into fuel cell stack array 110 via oxidant supply subsystem 136. Subsystem 136 may optionally comprise devices such as, for example, a humidifier and/or oxygen enrichment system through which the oxidant stream is directed en route to fuel cell stack array 110. Bypass valves 138 or 139 may be used to divert the oxidant stream away from the fuel cell stack array 110 if desired, for example, in a terrestrial vehicle moving downhill as described above.

Traction motor 120 is also mechanically coupled to drive pumps 140 and 146 which circulate coolant fluids in fuel cell stack cooling system 148. Pump 140 directs and circulates cooling water through internal passages in the fuel cell stacks of array 110. Pump 146 circulates a coolant, such as glycol through heat exchangers, including radiator 156 in cooling system 148. As will be apparent to those skilled in the art, other cooling system configurations involving one or more cooling loops may be used. The traction motor also drives fan 154 for cooling radiator 156, for example, via hydrostatic coupling.

Fuel is supplied to the fuel cell stacks of array 110 from a fuel storage system 195 via a fuel supply system 190. Fuel supply system 190 may include, for example, a fuel processor such as a reformer, or a fuel purifier. One or more devices for directing process streams through fuel supply system 190 to the fuel cell stacks in array 110, may also be operatively connected to traction motor 120.

In addition to driving devices for directing fluid streams to fuel cell stacks in array 110, traction motor 120 is mechanically coupled to drive a compressor 164 in air brake system 165, an alternator 166 connected to 24 volt DC system 167, a fluid pump 168 in power steering system 169, a compressor 174 used in the vehicle's air conditioning system 176, and one or more pumps 184 in the traction motor cooling and lubrication system 186. In each case, the need for an additional motor and inverter/controller is obviated.

Figure 3:
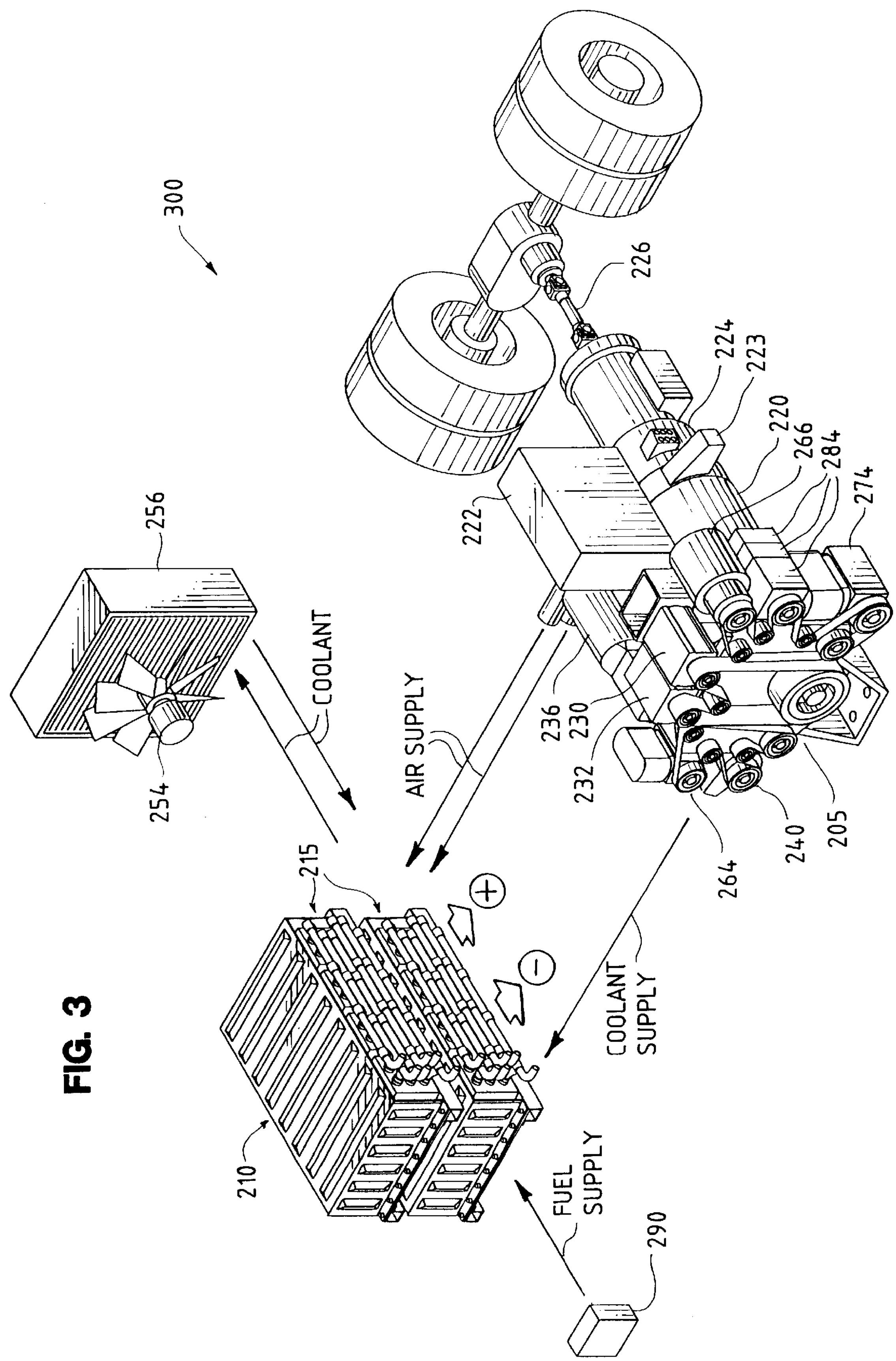
FIG. 3 is an isometric illustration of an embodiment of a fuel cell engine with the traction motor operatively connected to drive various auxiliary devices including a stack fluid supply device.

FIG. 3 is an isometric illustration of an embodiment of a fuel cell engine 300 with a power take-off mechanism 205 by which traction motor 220, in a wheeled vehicle such as a transit bus, is operatively connected to drive various auxiliary devices including fluid supply devices for directing fluid streams to the fuel cell stacks in an array 210. In the illustrated embodiment, power take-off mechanism 205 comprises external belt drives and internal gear and chain drives. Fuel cell stack array 210 is connected (connection not shown) to deliver electric power to electric traction motor 220, via an inverter/motor controller module 222. Fuel cell stack array 210 comprises supply and exhaust manifolding 215 via which various fluids, including reactant and coolant streams, are directed to and from interior passages in the fuel cell stacks.

In the illustrated embodiment, traction motor rotation is decouplable from the vehicle drive shaft and standard differential assembly 226 via motor/transmission adaptor 223 and automatic transmission 224 with a fluid clutch or torque converter. Traction motor 220 is mechanically coupled via a belt to drive an air supply system including compressor 230 for directing a reactant oxidant stream into fuel cell stack array 210 via an oxidant supply subsystem 236 comprising, for example, an aftercooler, filter and humidifier. An expander 232 may also be coupled to the traction motor 220, for example, in order to directly recover energy from the air exhaust system and direct it to the propulsion system. The oxidant stream is directed to the stacks of the array 210 via array manifolding 215.

Traction motor 220 is also operatively connected via external belt drives to drive a pump 240 for directing and circulating cooling water through internal passages in the fuel cell stacks of array 210 via array manifolding 215, and through radiator 256. In the illustrated embodiment, fan and motor 254, for cooling radiator 256, are powered via a separate inverter (not shown) which is independently electrically powered by fuel stack array 210. Traction motor 220 is mechanically coupled via belt drives to drive air brake compressor 264, alternator 266, air conditioning compressor 274 and pumps 284 in the traction motor cooling and lubrication system. Reactant fuel is directed to fuel cell stacks in array 210 from fuel supply system 290 also via array manifolding 215.

FIG. 4 is a simplified schematic diagram of an embodiment of a fuel cell engine 400 for a wheeled vehicle such as a transit bus, with wheel motors 312, 314 connected to receive electric power from fuel cell stack array 310 via inverter/motor controllers 311, 313 respectively. The wheel motors 312, 314 are for propelling the vehicle. Fuel cell stack array 310 is also connected to deliver electric power to primary motor 320, via an inverter/motor controller 322. Primary motor 320 is operatively connected to drive various auxiliary devices including fluid supply devices for directing fluid streams to fuel cell stacks in array 310. Specifically, in the illustrated embodiment, primary motor 320 is mechanically coupled to drive an air compressor 330, for directing a reactant oxidant stream into fuel cell stack array 310 via oxidant supply subsystem 336. It is also mechanically coupled to drive pumps 340 and 346 which circulate coolant fluids in fuel cell stack cooling system 348, and fan 354 for cooling radiator 356.

Fuel is supplied to the fuel cell stacks of array 310 from a fuel storage system 395 via fuel supply system 390.

Primary motor 320 is also mechanically coupled to drive a compressor 364 in air brake system 365, an alternator 366 connected to 24 volt DC system 367, a fluid pump 368 in power steering system 369, a compressor 374 used in the vehicle's air conditioning system 376, and one or more pumps 384 in the primary motor cooling and lubrication system 386.

In cars, buses and trucks, by using an electric traction motor that can interface with standard automotive components, the fuel cell engine may be integrated or retrofitted into a conventional vehicle, for example replacing the internal combustion engine as the powerplant.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the spirit and scope of the invention.

What is claimed is:

1. A fuel cell engine for a wheeled vehicle, said engine comprising:

(a) at least one fuel cell stack for producing electric power from a fuel and an oxidant;

(b) at least one wheel motor for propelling said vehicle, said at least one wheel motor connected to receive electric power from said at least one fuel cell stack;

(c) a primary motor connected to receive electric power from said at least one fuel cell stack;

(d) a device for directing a fluid stream into said fuel cell stack;

wherein said primary motor is operatively connected to mechanically drive said device.

2. The fuel cell engine of claim 1 wherein said fluid stream comprises a reactant for said fuel cell stack.

3. The fuel cell engine of claim 2 wherein said engine comprises a plurality of auxiliary mechanical loads and said primary motor is further operatively connected to drive at least one of said plurality of said auxiliary mechanical loads.

4. The fuel cell engine of claim 3 wherein at least one of said plurality of auxiliary mechanical loads is a compressor in an air brake system.

5. The fuel cell engine of claim 3 wherein at least one of said plurality of auxiliary mechanical loads is an alternator.

6. The fuel cell engine of claim 3 wherein at least one of said plurality of auxiliary mechanical loads is a fluid pump in a power steering system.

7. The fuel cell engine of claim 3 wherein at least one of said plurality of auxiliary mechanical loads is a compressor used in an air conditioning system within said vehicle.

8. The fuel cell engine of claim 3 wherein at least one of said plurality of auxiliary mechanical loads is a pump in a cooling or lubrication system of said primary motor.

9. The fuel cell engine of claim 3 wherein each of said plurality of auxiliary mechanical loads is selected from the group consisting of a compressor in an air brake system, an alternator, a fluid pump in a power steering system, a compressor used in an air conditioning system within said vehicle, and a pump in a cooling or lubrication system of said primary motor.

* * * * *